UNITED STATES PATENT OFFICE.

ALFRED KRAUS, OF PARIS, FRANCE.

COMPOSITION FOR STEREOTYPING, &c.

SPECIFICATION forming part of Letters Patent No. 647,417, dated April 10, 1900.

Application filed May 16, 1899. Serial No. 717,015. (No specimens.)

*To all whom it may concern:*

Be it known that I, ALFRED KRAUS, chemist, of No. 10 Rue Marbeuf, Paris, in the French Republic, have invented a certain new and useful Improved Composition for Stereotyping, &c., of which the following is a full, clear, and exact description.

The present invention relates to a plastic composition in which, with the assistance of a type-writing machine, impressions of letters may be produced, so that the impressed material after hardening in the drying oven or chamber can be used as matrices for casting metal and in this manner blocks produced ready for printing purposes.

The plastic material consists principally of sculptor's clay mixed with white lead, to which some gypsum is added, so that the clay may not shrink and crack in drying. To prevent a too-rapid hardening of the gypsum, marshmallow powder or the like may be added in slight quantity. Likewise slight additions of lime, fire-clay powder, coke powder, and the like for binding purposes may be employed.

By way of example the following proportions may be used, namely: twenty to twenty-five grams of white lead, fifty to sixty grams of modeling-clay, thirty grams of gypsum, two grams of lime, two grams of fire-brick powder, two grams of powdered coke, ten grams of marshmallow powder, and twenty to thirty grams of water.

The material described remains plastic as long as desired and becomes hard by simply undergoing the necessary drying process for a short time in a drying-oven, acquiring thereby at the same time the strength (or qualities of resistance) requisite for the operation of casting the blocks.

Before the plastic material is introduced into the type-writing machine its surface is smoothed or flattened by means of a slightly greased or oiled roller or cylinder. The material must be so placed in the machine that the type-writing types strike it at a right angle. The typist now proceeds to write by means of the set of keys, as on ordinary paper, obviously without employing an inking-ribbon. The desired impressions are accordingly produced on the plastic material, which yields a fully-legible, sharp, and clear series of positive types. The plastic material is now put into the drying-chamber and there dried until it is of the requisite degree of hardness— an operation requiring but little time. The matrices can then be used for casting the blocks by any of the known methods. The blocks thus obtained serve as printing-plates and after being used can be melted up again.

The plastic material can be kept for further use as stereotype-matrices or be ground up in a grinding-mill and after the addition thereto of the water eliminated therefrom through the drying process again resumes its plastic properties.

I claim as my invention—

1. A plastic composition for stereotyping, consisting of a mixture of modeling-clay, white lead and gypsum with water, marshmallow powder and binding additions, substantially as described.

2. A plastic material for stereotyping and adapted to receive its impressions from the type-writer, said material being composed of twenty to twenty-five grams of white lead, fifty to sixty grams of modeling-clay, thirty grams of gypsum, two grams of lime, two grams of fire-brick powder, two grams of powdered coke, ten grams of marshmallow powder and twenty to thirty grams of water, substantially as described.

In testimony whereof I have signed my name to this specification in the presence of two subscribing witnesses.

ALFRED KRAUS.

Witnesses:
CHARLES DONER,
EDWARD P. MACLEAN.